(12) United States Patent
Goch

(10) Patent No.: US 8,203,074 B2
(45) Date of Patent: Jun. 19, 2012

(54) MESSENGER SUPPORTED OVERHEAD CABLE FOR ELECTRICAL TRANSMISSION

(75) Inventor: Waymon P. Goch, Clinton, OH (US)

(73) Assignee: Advanced Technology Holdings Ltd., Dana Point, CA (US)

( * ) Notice: Subject to any disclaimer, the term of this patent is extended or adjusted under 35 U.S.C. 154(b) by 206 days.

(21) Appl. No.: 11/906,387

(22) Filed: Oct. 2, 2007

(65) Prior Publication Data

US 2008/0099226 A1    May 1, 2008

Related U.S. Application Data

(60) Provisional application No. 60/854,289, filed on Oct. 25, 2006.

(51) Int. Cl.
*H02G 7/08* (2006.01)

(52) U.S. Cl. ......................................................... 174/41

(58) Field of Classification Search .............. 174/40 CC, 174/41, 42
See application file for complete search history.

(56) References Cited

U.S. PATENT DOCUMENTS

| | | | |
|---|---|---|---|
| 960,291 A | 6/1910 | Egner et al. | |
| 2,387,783 A | 10/1945 | Tawney | |
| 2,891,751 A * | 6/1959 | Raypholtz | 248/61 |
| 2,915,580 A * | 12/1959 | Fletcher et al. | 174/43 |
| 2,956,311 A | 10/1960 | Raydt et al. | |
| 2,991,397 A | 7/1961 | Place | |
| 3,005,609 A * | 10/1961 | Joffe | 248/61 |
| 3,121,840 A | 2/1964 | Lamb | |
| 3,139,482 A * | 6/1964 | Peters et al. | 174/160 |
| 3,207,836 A | 9/1965 | Slechta | |
| 3,267,201 A | 8/1966 | Pusey et al. | |
| 3,288,913 A | 11/1966 | Maddux | |
| 3,297,814 A | 1/1967 | McClean et al. | |
| 3,674,581 A * | 7/1972 | Kalnin et al. | 156/84 |
| 3,834,674 A * | 9/1974 | Jackson | 254/394 |
| 3,927,248 A | 12/1975 | Scholl et al. | |
| 3,963,855 A * | 6/1976 | Hawkins et al. | 174/40 R |
| 4,181,815 A | 1/1980 | Lundberg et al. | |
| 4,378,462 A | 3/1983 | Arnold, Jr. et al. | |
| 4,397,435 A | 8/1983 | Fisher et al. | |
| 4,438,293 A | 3/1984 | Voser | |
| 4,525,596 A * | 6/1985 | Diana | 174/42 |
| 4,562,982 A | 1/1986 | McSherry et al. | |
| 4,620,060 A | 10/1986 | Perinetti | |
| 4,763,983 A | 8/1988 | Keith | |
| 4,856,867 A | 8/1989 | Gaylin | |
| 5,095,176 A | 3/1992 | Harbrecht et al. | |
| 5,448,670 A | 9/1995 | Blew et al. | |
| 5,678,609 A | 10/1997 | Washburn | |
| 6,356,690 B1 * | 3/2002 | McAlpine et al. | 385/109 |

(Continued)

FOREIGN PATENT DOCUMENTS

DE    2129843    12/1972

(Continued)

*Primary Examiner* — Chau Nguyen

(74) *Attorney, Agent, or Firm* — The Watson I.P. Group, PLC; Jovan N. Jovanovic; Vladan M. Vasiljevic

(57) ABSTRACT

A transmission line assembly for transmission and distribution of high voltage power which comprises a conductor, a separate messenger member and coupling means. The conductor has a predetermined length. The separate messenger member has a predetermined length. The coupling means couples the messenger to the conductor to the messenger. The messenger member and the conductor remain structurally separate from each other and functionally independent.

5 Claims, 9 Drawing Sheets

U.S. PATENT DOCUMENTS

| | | |
|---|---|---|
| 6,448,503 B1 * | 9/2002 | Mc Kinnon et al. .......... 174/146 |
| 6,546,175 B1 * | 4/2003 | Wagman et al. .............. 385/113 |
| 6,563,990 B1 * | 5/2003 | Hurley et al. ................. 385/101 |
| 6,728,455 B2 | 4/2004 | Kusakari et al. |
| 6,775,445 B2 | 8/2004 | Kobayashi et al. |
| 6,841,729 B2 | 1/2005 | Sakabe et al. |
| 7,019,217 B2 | 3/2006 | Bryant |
| 7,041,909 B2 | 5/2006 | Hiel et al. |
| 7,060,326 B2 | 6/2006 | Hiel et al. |
| 7,179,522 B2 | 2/2007 | Hiel et al. |
| 7,211,319 B2 | 5/2007 | Hiel et al |
| 2005/0186410 A1 | 8/2005 | Bryant et al. |
| 2005/0227067 A1 | 10/2005 | Hiel et al. |
| 2006/0051580 A1 | 3/2006 | Bryant et al. |
| 2007/0128435 A1 | 6/2007 | Hiel et al. |
| 2007/0205016 A1 | 9/2007 | Bryant et al. |
| 2008/0164051 A1 * | 7/2008 | Lee et al. ................. 174/131 A |

FOREIGN PATENT DOCUMENTS

| | | |
|---|---|---|
| JP | 2003/84176 | 3/2003 |
| JP | 2004/252004 | 9/2004 |
| JP | 2004/357365 | 12/2004 |
| JP | 2006/100181 | 4/2006 |
| WO | WO 03/901008 * | 11/2003 |

* cited by examiner

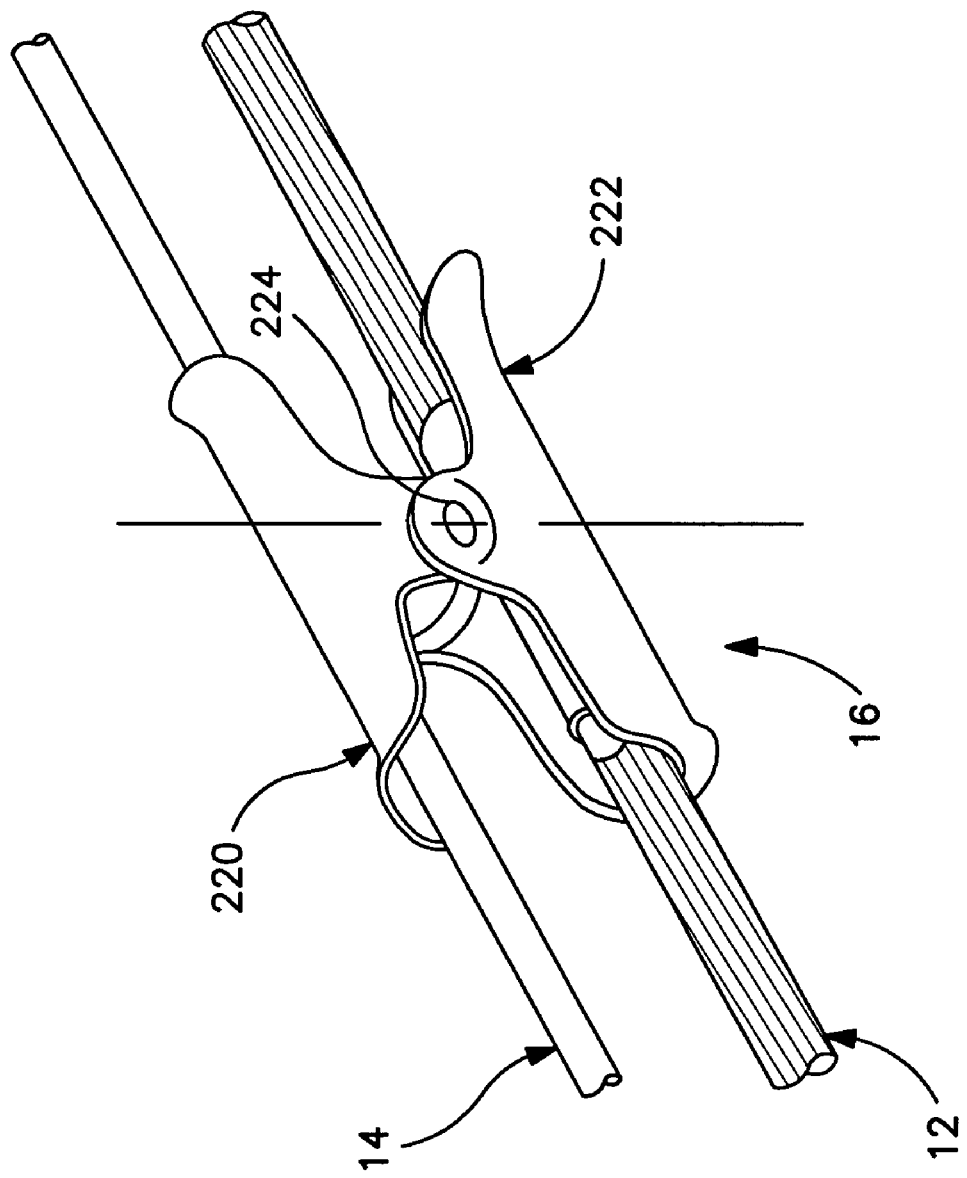

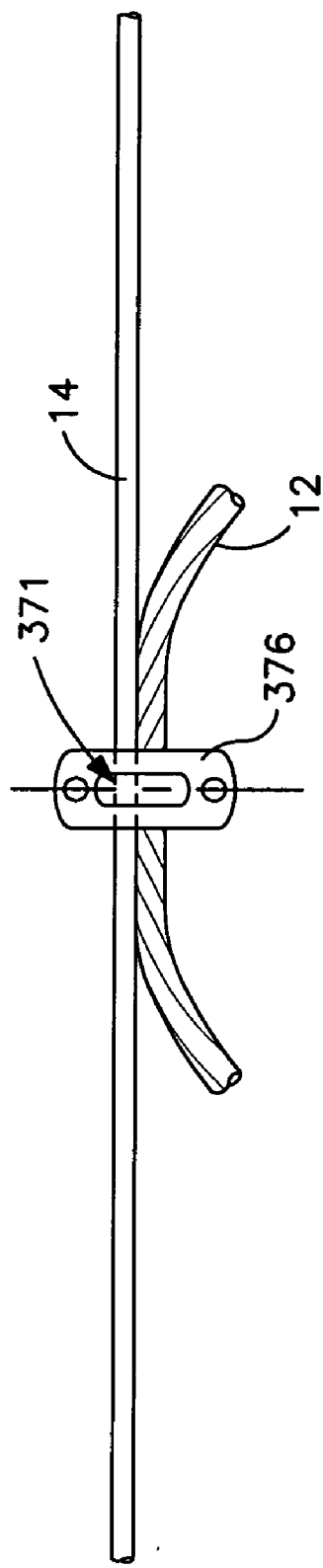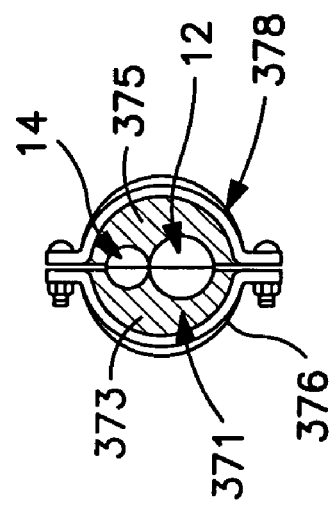

ing line assembly for transmission and distribution of high voltage power which comprises a conductor, a separate messenger member and coupling means. The conductor has a predetermined length. The separate messenger member has a predetermined length. The coupling means couples the messenger to the conductor to the messenger. As such, the messenger member and the conductor remain structurally separate from each other and functionally independent.

MESSENGER SUPPORTED OVERHEAD CABLE FOR ELECTRICAL TRANSMISSION

CROSS-REFERENCE TO RELATED APPLICATION

The present application claims priority from U.S. App. Ser. No. 60/854,289 filed Oct. 25, 2006, entitled "Messenger-supported Overhead Cables (MSC) for Electrical Transmission" the entire specification of which is hereby incorporated in its entirety.

BACKGROUND OF THE INVENTION

1. Field of the Invention

The invention relates in general to a transmission cable intended for the transmission and distribution of electrical power, and typically, high voltage electrical power. More particularly, the transmission cable of the present invention separates the mechanical strength member from the electrical current carrying member, such that each can be designed and configured without dependence on the other.

2. Background Art

The demand for transmission and distribution cables increases with the greater demand for electricity. As the appetite for power increases, new electrical cables continue to be installed. Additionally, to increase capacity, other electrical installations are rewired with cables of greater capacity.

Traditionally, such electrical cables comprise a central stranded steel core which is wrapped in a stranded aluminum conductor. Such cables have been utilized for decades with very little change. Amongst other drawbacks, such cables are susceptible to excessive sag in certain climates and under certain operating conditions. Furthermore, such cables are susceptible to corrosion in other environments.

To combat the shortcomings, other composite based solutions have been developed. Certain such solutions are described in U.S. Pat. No. 7,060,326; U.S. Pub. Nos. 2004-0131834; 2004-0131851; 2005-0227067; 2005-0129942; 2005-0186410; 2006-0051580; U.S. Prov. Pat. App. No. 60/374,879; and PCT Pub. No. WO 03/091008, the entire disclosures of each of the foregoing are incorporated herein by reference in their entirety. Such solutions have replaced the central steel stranded core with a composite material having a core component formed from a carbon fiber material embedded within a matrix and an outer component formed from a fiber material other than carbon embedded within a resin. The core is formed by pultruding the various fibers through pultrusion dies.

Despite these additional developments, the continuing drawback associated with the foregoing conductor solutions is that the mechanical strength member is intertwined and inseparably coupled with the current carrying conductor. As such, the current carrying conductor is limited in construction due to the considerations of its mechanical strength. Additionally, the mechanical strength member is limited by its compatibility with the conductor. For example, due to the relationship between the conductor and the core, the heat requirements of the core are quite elevated, due to the proximity thereof with the conductor. Additionally, as the conductor and the core are both spliced and dead ended together, it is necessary to consider both the conductor and the core when configuring such a splice or a dead end. Such considerations often lead to a compromised solution.

It is another object of the present invention to separate the mechanical strength member from the current carrying conductor in transmission lines.

It is another object of the invention to provide independently designed and configured mechanical strength members and current carrying conductors in transmission lines.

These objects as well as other objects of the present invention will become apparent in light of the present specification, claims, and drawings.

SUMMARY OF THE INVENTION

The invention is directed to a transmission line assembly for transmission and distribution of high voltage power which comprises a conductor, a separate messenger member and coupling means. The conductor has a predetermined length. The separate messenger member has a predetermined length. The coupling means couples the messenger to the conductor to the messenger. As such, the messenger member and the conductor remain structurally separate from each other and functionally independent.

In a preferred embodiment, the conductor comprises a substantially circular cross-section which includes a plurality of strands uniformly dispersed therethrough.

In another preferred embodiment, the messenger comprises an insulative member including a plurality of fibers embedded in a resin matrix.

In another preferred embodiment, the plurality fibers comprises one or more of the following fibers, carbon fibers, basalt fibers, s-glass fibers, r-glass fibers, s2-glass fibers or other glass fibers.

Preferably, the conductor is structurally configured to operate between 2,400 V and 765,000 V.

In another preferred embodiment, the conductor and the messenger member are spaced apart from each other a predetermined distance. The coupling means facilitates the maintenance of the separation of the messenger relative to the conductor.

In one such preferred embodiment, the coupling means comprises a pair of bracket members. Each bracket member includes a conductor indentation and a messenger indentation. Upon positioning of the bracket members in operable association, the conductor indentation of each of the bracket members cooperate to surround and capture the conductor. Similarly, the messenger indentation of each of the bracket members cooperate to surround and capture the messenger member. An attachment assembly configured to retain the bracket members in operable engagement.

In a preferred embodiment, the attachment assembly comprises a fastener attachable to each of the bracket members.

In a preferred embodiment, the coupling means comprises a bracket member having a messenger indentation at a first end thereof and a conductor indentation at the other end thereof. A messenger clamp assembly is pivotally coupled to the bracket member proximate the messenger indentation. The messenger clamp cooperates with the bracket member to retain the messenger within the messenger indentation. A conductor clamp assembly is pivotally coupled to the bracket member proximate the conductor indentation. The conductor clamp cooperates with the bracket member to retain the conductor within the conductor indentation.

In another preferred embodiment, at least one of the messenger indentation and the conductor indentation includes a liner or a resilient member to preclude damage to the respective one of the conductor and messenger relative to the bracket member.

In another preferred embodiment, the coupling means comprises a messenger tray assembly defining a channel structurally configured to receive the messenger, a conductor tray assembly defining a channel structurally configured to receive the conductor, and a pivotable coupling assembly which facilitates the pivotable coupling of the messenger tray assembly relative to the conductor tray assembly.

In yet another preferred embodiment, at least one of the messenger tray assembly and the conductor tray assembly further includes a clamp member configured to clamp the respective one of the conductor and the messenger thereto.

In a preferred embodiment, the pivotable coupling means comprises a pair of ear members on each of the messenger tray assembly and the conductor tray assembly. A pivoting connector pivotably extends through each of the ear members, to in turn, facilitate pivoting of the messenger tray assembly relative to the conductor tray assembly.

In a preferred embodiment, the pivotable coupling means comprises at least one link which is pivotably connected at the first end to the conductor tray assembly and pivotably connected at the second end to the messenger tray assembly.

In a preferred embodiment, the apparatus further comprises a second conductor. The first conductor, the second conductor and the messenger member are spaced apart from each other a predetermined distance. The coupling means facilitates the maintenance of the separation of the messenger relative to the conductor. The coupling member comprises a frame member having a central region and opposing wing members. The messenger member is coupled to the central region of the frame member, and each conductor is pivotably connected to opposing wing members of the frame member.

In a preferred embodiment, the coupling means comprises a flexible housing member extending over the conductor and the messenger. An armor grip clamp assembly comprises a pair of semi-circular clamps extending around a portion of the flexible housing member and coupling to each other to releasably retain the same.

In another preferred embodiment, the coupling means comprises a flexible liner which is structurally configured to maintain the messenger member and the conductor in a spaced apart configuration. A clamp member extends over the flexible liner to releasably maintain the flexible liner relative to the messenger and the conductor.

In yet another preferred embodiment, the coupling means comprises the wrapping of the conductor relative to the messenger in a helical winding, along the length thereof.

BRIEF DESCRIPTION OF THE DRAWINGS

The invention will now be described with reference to the drawings wherein:

FIG. 7 of the drawings comprises a perspective view of the transmission line of the present invention, showing, in particular, another embodiment of the coupling means of the present invention;

FIG. 11 of the drawings comprises a side elevational view of the transmission line of the present invention, showing, in particular, another embodiment of the coupling means;

FIG. 12 of the drawings comprises a cross-sectional view of the transmission line shown in FIG. 11;

DETAILED DESCRIPTION OF THE INVENTION

Figure 1:
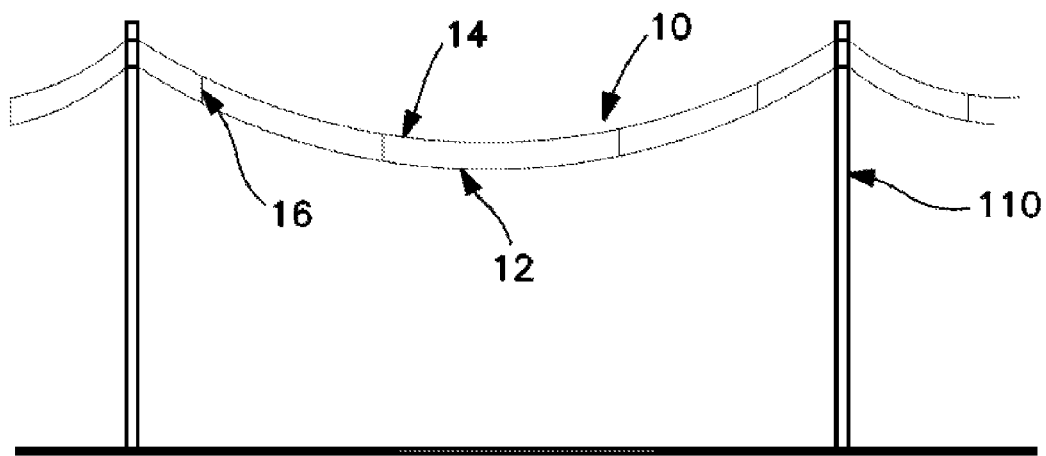
FIG. 1 of the drawings comprises a side elevational view of a typical installation of a transmission line of the present invention, showing, in particular, a span between towers.

While this invention is susceptible of embodiment in many different forms, there is shown in the drawings and described herein in detail a specific embodiment with the understanding that the present disclosure is to be considered as an exemplification of the principles of the invention and is not intended to limit the invention to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, the transmission line of the present invention is shown generally at 10. Typically, such conductors are used to transmit and distribute high voltage power forming the backbone of the national grid, for example. The electrical conductor is typically strung between electrical poles and towers 110 of varying sizes. The system operating voltages of such electrical conductors typically ranges from 2,400 V to 765,000 V, although not limited thereto. The transmission line includes conductor 12, messenger member 14 and coupling means 16. The conductor of the type associated with the present invention is typically referred to as stranded overhead transmission and distribution conductor.

Unlike commonly utilized transmission lines, wherein the conductor encapsulates a strength member, such as a steel core, for example, with the present invention, the conductor and the messenger are structurally separate from each other and functionally independent relative to each other. Specifically, conductor 12 comprises an aluminum stranded member of a predetermined length (i.e., typically up to several hundred feet long) having a plurality of strands, such as strand 20.

The strands are wound about each other, preferably with a slight helical winding. In the embodiment shown, each of the strands 20 are substantially uniform in cross-sectional area. Inasmuch as there is no separate core member, the conductor occupies the entirety of the cross-sectional area of the conductor in a substantially uniform manner. In the embodiment shown, the conductor may comprise aluminum or an alloy thereof (which may be heat treated in any number of different manners, such as annealing, among others). Other materials are contemplated, but typically, aluminum and/or an alloy thereof is most preferred. Advantageously, as the strength member is separated from the conductor, a relatively softer conductor, with improved conductive capacity may be utilized, as the conductor is not relied upon for its strength characteristics at splices and dead ends.

Messenger 14 is shown in FIG. 1 as comprising a composite material of a predetermined length (i.e., typically up to several hundred feet long). The composite material may comprise one or more different fibers 22 which are embedded in a matrix 24. The fibers may comprise any one or more of carbon fiber, glass fiber (including, but not limited to s-glass, r-glass, s2-glass), basalt fibers, among others, which are embedded in a resin matrix. In the embodiment shown, a single uniform fiber extending longitudinally is contemplated. It is contemplated that instead of extending longitudinally, the fibers may be helically wound at, for example between 0 and 45 degrees, and more preferably between 0 and 5 degrees.

Inasmuch as the messenger is not surrounded by the conductor, as is typically the case for high power transmission lines, the messenger, in operation, is exposed to substantially lower temperatures and is generally exposed to ambient along much of its surface. In many of the embodiments, the messenger and the conductor are separated an appreciable distance, such that the heat from the conductor has little effect to the temperature of the messenger. The conductor may have splicing and/or dead end connectors so as to join the various messengers.

Figure 15:
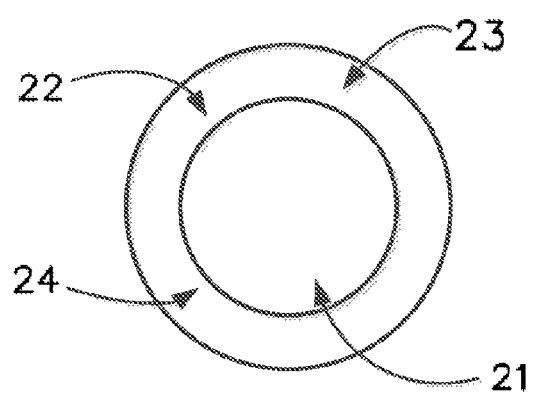
FIG. 15 of the drawings comprises a front plan view of the messenger showing, in particular, an embodiment wherein a central core of carbon is surrounded by an insulative fiber, such as glass.

To preclude conduction, the messenger comprises a composite wherein the outer layer is insulative. In certain embodiments, such as the embodiment of FIG. 15, especially where carbon fiber 21 is utilized, additional layers of fiber 23 that are comprised of material other than carbon fiber (such as glass fiber) may be utilized as the outer layers. In still other embodiments, a coating, such as a polymer coating, a tape or a paint coating may be applied to the outside of the messenger to insure the insulative effect.

Figure 2:
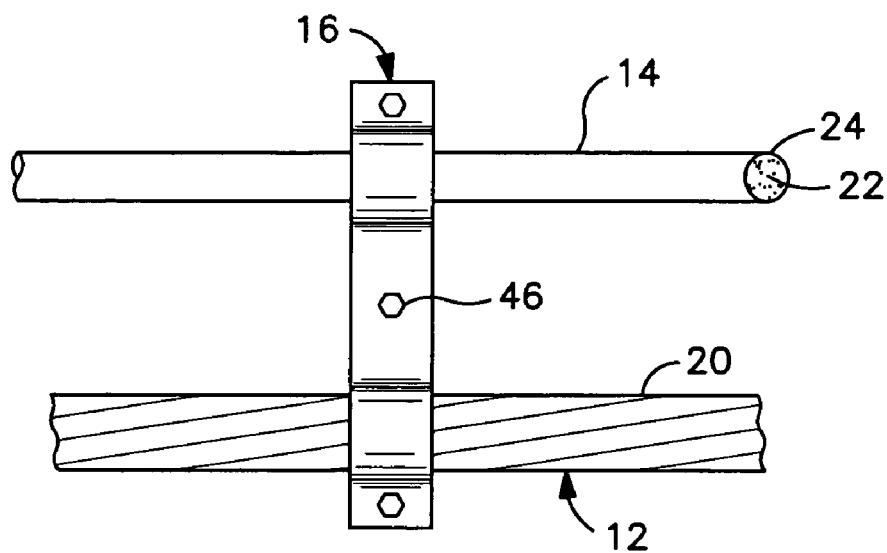
FIG. 2 of the drawings comprises a partial side elevational view of an embodiment of the transmission line of the present invention, showing, in particular, an embodiment of the coupling means.
Figure 3:
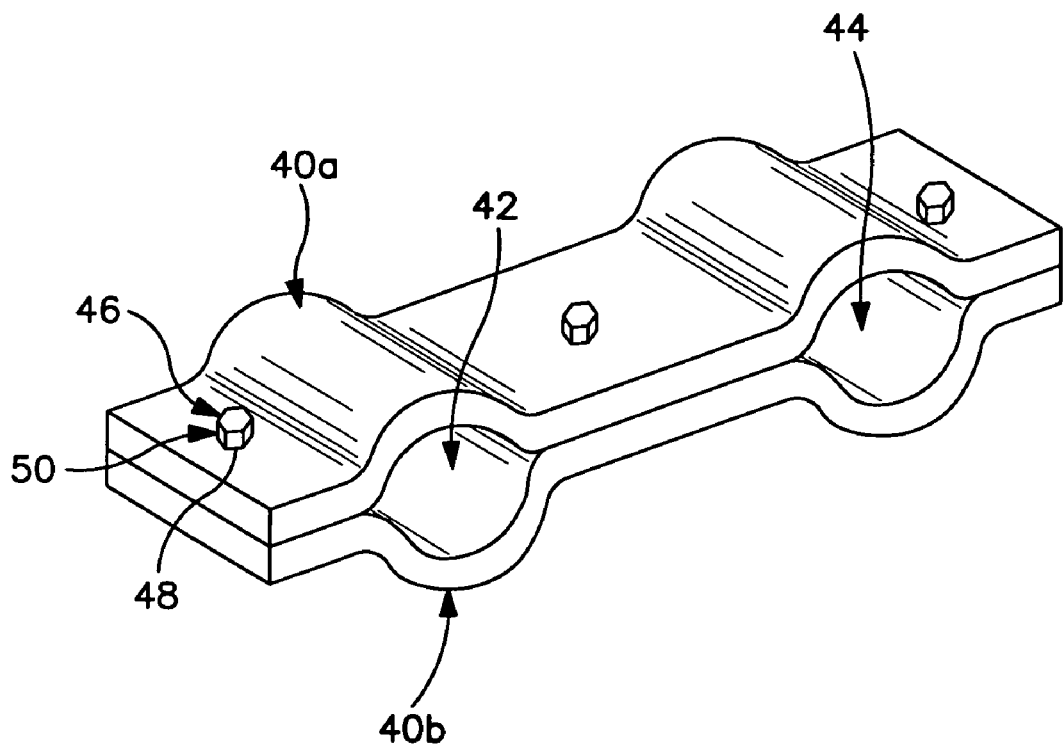
FIG. 3 of the drawings comprises a perspective view of the coupling means of the embodiment shown in FIG. 2.

Coupling means 16 is shown in FIGS. 2 and 3 as comprising bracket members 40a, 40b, and bracket attachment assembly 46. The bracket members 40a and 40b are generally identical, and, as such, bracket member 40a will be described with the understanding that bracket member 40b is substantially identical. Bracket member 40a comprises an elongated bar-like member which includes messenger indentation 42 and conductor indentation 44 which are separated from each other a predetermined distance. Preferably, the bracket comprises a molded fiber reinforced member, or a metallic member. The indentations 42, 44 are generally sized so as to receive half of the respective connector and/or messenger therein. Thus, when the bracket members are coupled together, the conductor is received in part by the conductor indentation of each of the brackets 40a, 40b. Similarly, the messenger is received in part by the messenger indentation of each of the brackets 40a, 40b.

It will be understood that the bracket members, in certain embodiments, may be different in that they may have different indentation configurations. In one such embodiment, the indentations of one bracket may be smaller or substantially smaller than the indentations of the other bracket (or one bracket may be planar, or without messenger or conductor indentations). In such an embodiment, the conductor and the messenger are retained to a greater extent in the indentations of one of the two bracket members.

Attachment assembly 46 comprises suitable fasteners 50 which are extended through openings, such as openings 48 in each of the brackets. In the embodiment shown, the fasteners comprise nuts and bolts, whereas in other embodiments, the two brackets may be riveted together, adhered to each other, coupled to each other with pins, amongst other solutions. In still other embodiments, the openings of one or both of the brackets may be threaded so as to obviate the need for a separate fastener.

Figure 4:
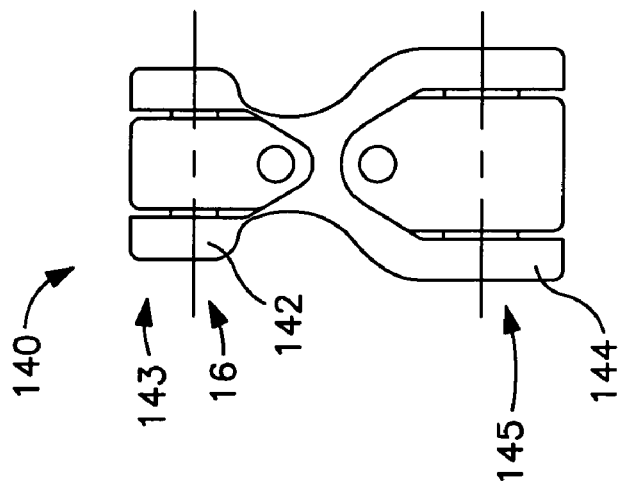
FIG. 4 of the drawings comprises a front elevational view of another embodiment of the coupling means of the present invention.
Figure 6:
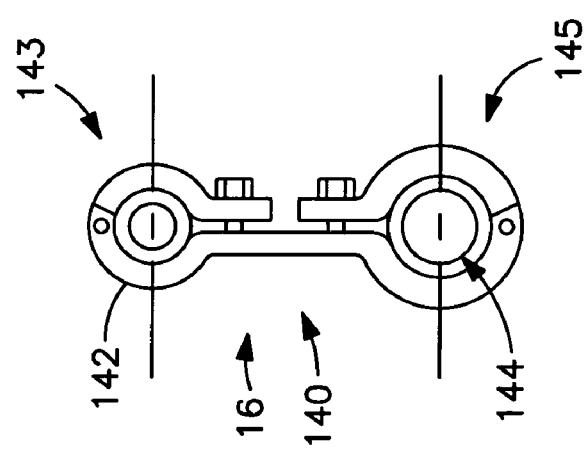
FIG. 6 of the drawings comprises a side elevational view of the embodiment of the coupling means shown in FIG. 4, shown in an open configuration ready for the receipt of a messenger and a conductor.
Figure 5:
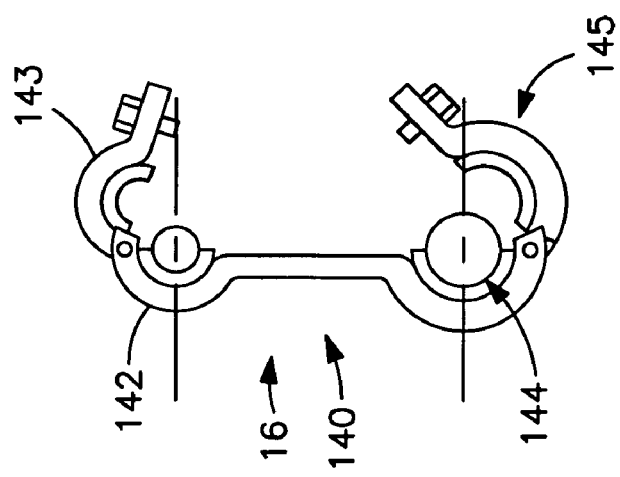
FIG. 5 of the drawings comprises a side elevational view of the embodiment of the coupling means shown in FIG. 4, shown in a coupled configuration.

In another embodiment, and with reference to FIGS. 4 through 6, the coupling means 16 may comprise a bracket member 140, messenger clamp assembly 143 and conductor clamp assembly 145. The bracket member 140 includes messenger indentation 142 and conductor indentations 144. The two indentations 142, 144 are separated from each other a predetermined distance. Additionally, the two indentations may be lined with a rubber material or another resilient member (such as a polymer). The bracket member 140, itself, may be formed from a metallic member or from a molded fiber reinforced member, without limitation.

Messenger clamp assembly 143 is comprised of a first end which is pivotably coupled to the bracket member 140 proximate the messenger indentation 142. The second end of the messenger clamp assembly 143 comprises a fastener which is configured to engage the bracket member opposite of the first end. The messenger clamp includes a rubber member or other flexible member. Thus, when the messenger clamp is pivoted so that the second end abuts the bracket member 140, the messenger is captured between the messenger clamp and the messenger indentation of the bracket member. The flexible members associated with each of the messenger indentation and the messenger clamp assembly serve to cushion the interface between the bracket and the messenger, so as to reduce the damage imparted by one on the other. Additionally, the flexible members become biased against the messenger and in certain circumstances preclude the sliding of the bracket member along the messenger.

In a similar manner as with the messenger, the conductor is maintained in position through interference between the conductor indentation 144 and conductor clamp assembly 145. The conductor clamp assembly is pivotably connected at its first end to the bracket member and a fastener engageable with the bracket member is positioned at the second end. Each of the conductor clamp assembly and the conductor indentation include a rubber material or other flexible material positioned therein. As with the messenger, the flexible members associated with each of the conductor clamp assembly and the conductor indentation cooperate to cushion the interface between the bracket and the messenger, so as to reduce the damage imparted by one on the other. Additionally, the flexible members become biased against the conductor, and in certain circumstances preclude the sliding of the conductor against the bracket member.

In another embodiment, shown in FIG. 7, the coupling means 16 may comprise messenger tray assembly 220, conductor tray assembly 222 and pivotable coupling assembly 224. In the embodiment shown, the messenger tray assembly 220 comprises an elongated angled member which defines a channel in which the messenger is positioned. A clamp member (not shown) may be utilized to secure the messenger to the messenger tray assembly after positioning of the messenger within the channel. In one embodiment, the clamp member may comprise an elongated cap member which can be clamped or secured to the messenger tray assembly so as to sandwich the messenger therebetween.

Similarly, the conductor tray assembly 222 comprises an elongated angled member which defines a channel in which the conductor is positioned. A clamp member (not shown) may be utilized to secure the messenger to the conductor tray assembly after positioning of the conductor within the channel. In one embodiment, the clamp member may comprise an elongated cap member which can be clamped or secured to the conductor tray assembly so as to sandwich the conductor therebetween.

Figure 8:
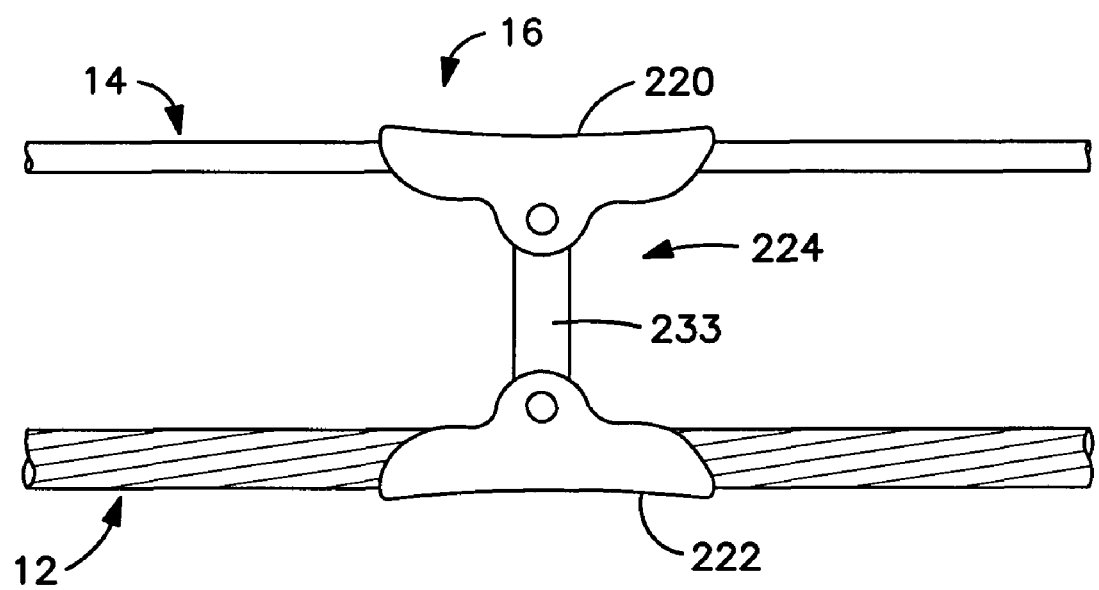
FIG. 8 of the drawings comprises a front elevational view of a transmission line of the present invention, showing, in particular, another embodiment of the coupling means.

Pivotable coupling assembly 224 is configured to pivotably couple the messenger tray assembly 220 and the conductor tray assembly 222. In the embodiment shown, the pivotable coupling assembly comprises a pair of ears extending from each of the messenger tray assembly 220 and the conductor tray assembly 222 on opposing sides thereof. The corresponding ears of the messenger tray assembly and the conductor tray assembly are then coupled with a pin, rivet, fastener or other suitable member to allow for pivoting therebetween. In other embodiments, such as the embodiment shown in FIG. 8, a separate link 233 may be positioned between the tray assemblies so that there are two points of pivoting between the conductor tray assembly and the messenger tray assembly.

Figure 10:
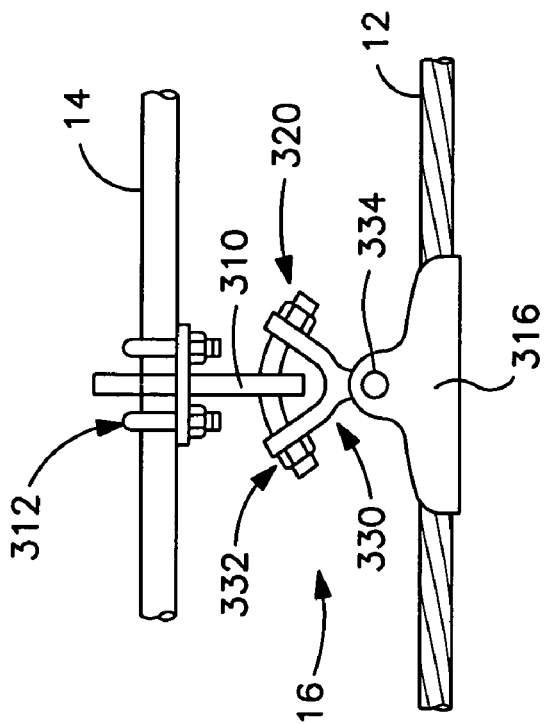
FIG. 10 of the drawings comprises a side elevational view of the transmission line of the present invention, showing, in particular, the coupling means of FIG. 9.
Figure 9:
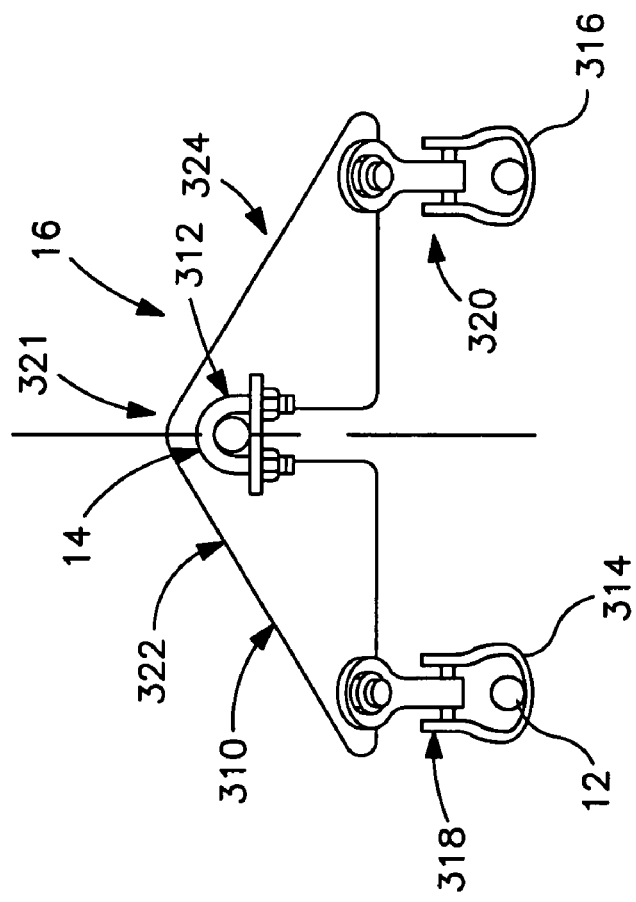
FIG. 9 of the drawings comprises a front elevational view of a transmission line of the present invention, showing, in particular, another embodiment of the coupling means for coupling a multiple number of conductors from a single messenger.

In yet another embodiment, a single messenger may be utilized to support a plurality of conductors. One such embodiment is shown in FIGS. 9 and 10. In such a configuration, coupling means 16 comprises frame member 310, messenger clamping member 312 and conductor clamping members 314, 316. Specifically, the frame member comprises a substantially planar member having central region 321 and opposing wing regions 322, 324. Clamping member 312 is coupled to the central region 321 and facilitates clamped attachment to the messenger 14. In the embodiment shown, the clamping member 312 comprises a conventional u-clamp. Of course, other clamping members are contemplated, including the clamping members shown and explained herein.

Each of the conductor clamp member 314, 316 comprises a conductor tray assembly of the type shown in the embodiment of FIG. 7. The conductor clamp members 314, 316 further include pivoting assembly 318, 320, respectively. Each pivoting assembly 318, 320 is substantially identical, and, as such, pivoting assembly 318 will be described with the understanding that it is substantially identical to the pivoting assembly 320. Specifically, the pivoting assembly 318 includes yolk link 330 and pivot pins 332, 334. The yolk link allows for pivoting in two distinct planes, namely one plane that is parallel to the plane defined by the frame member 310 and one plane that is parallel to the respective conductor. Thus, pivot pin 332 extends through frame member 310 and is substantially orthogonal to pivot pin 334 that extends through the opposing ears of the conductor tray assembly. In turn, the conductor is able to pivot in two different manners relative to the frame member.

Figure 13:
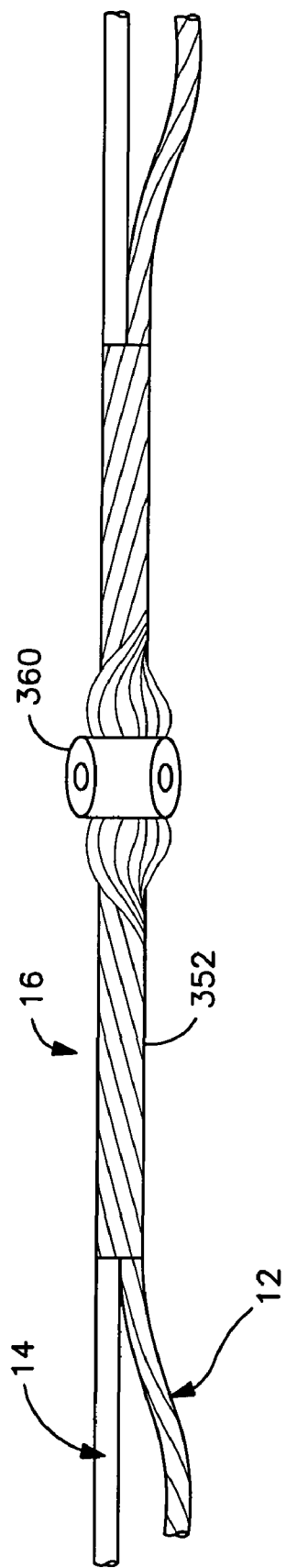
FIG. 13 of the drawings comprises a side elevational view of the transmission line of the present invention, showing, in particular, another embodiment of the coupling means.

With reference to FIG. 13, in another embodiment, the phase coupling means 16 may comprise a flexible housing member 352 which is extended over each of the messenger and the conductor, when the same is placed in a substantially abutting relationship. The coupling means 16 further includes armor grip clamp assembly 360 which comprises a pair of semi-circular clamp members with openings for fasteners at either end thereof. The semi-circular clamp members are positioned so as to overlie the flexible housing member 352 at which time, fasteners are utilized to couple the two semi-circular clamp members together. In the embodiment shown, the flexible housing member comprises a rubber tubing, however, other natural and synthetic polymer members are contemplated.

In a related embodiment, as is shown in FIGS. 11 and 12, in place of the flexible housing member 352 of FIG. 13, a flexible liner 371 can be utilized. The flexible liner may comprise a pair of members 373, 375 which are molded on the inner portion thereof to retain the messenger and the conductor in a spaced apart configuration. The outer portion of the flexible liners is configured to be grasped and retained by the semi-circular clamps 376, 378. The clamps may further include surface configurations, such as surface configuration 371 which interfaces with a mating surface configuration of the flexible liner so as to register the flexible liner relative to the semi-circular clamps, and to preclude relative movement thereof upon installation.

Figure 14:
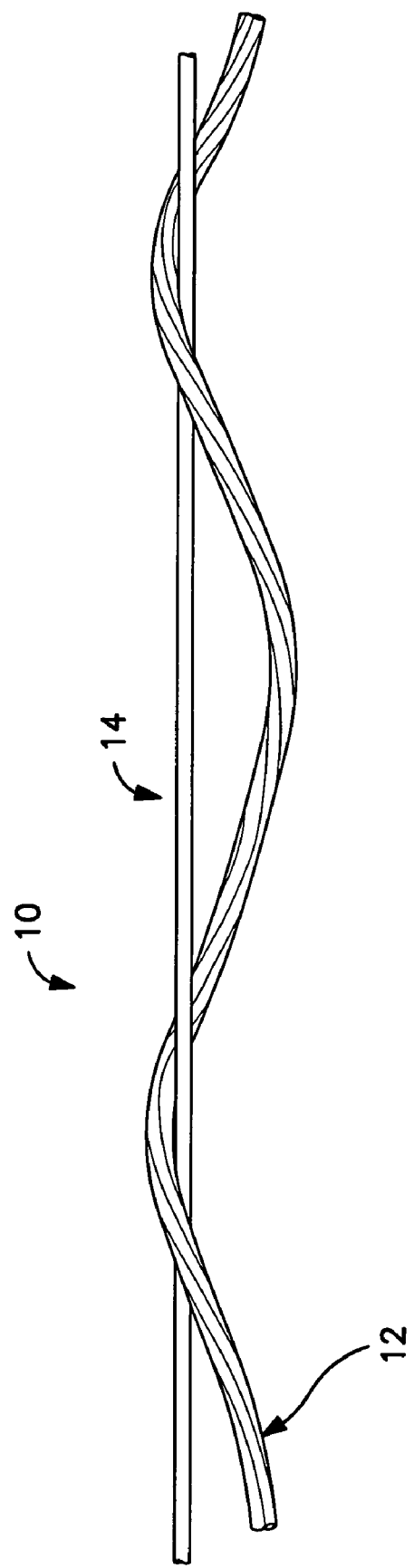
FIG. 14 of the drawings comprises a side elevational view of the transmission line of the present invention, showing, in particular, another embodiment of the coupling means.

Finally, in another related application, the coupling means may comprise the helical winding of the conductor about the messenger, as is shown in FIG. 14. In the embodiment shown, the helical winding is such that one winding corresponds to approximately nine feet of the messenger. In other embodiments, such a configuration may be limited to a lesser or greater length. As set forth above, the messenger of the present embodiment is not conductive such that the electrical load is carried by the conductor and not by the messenger. It is contemplated that the elongated messenger tray may be utilized to couple the messenger to an outside structure, such as a tower or pole.

Advantageously, in the above-identified embodiments, the load bearing messenger and the current carrying conductor are separated and isolated from each other. As such, an independent design of each is allowed, as there is no dependence on the load bearing properties of the conductor or the current carrying of the messenger. As the conductor consists entirely of aluminum (i.e., no steel core or composite core as is used in conventional core-based transmission lines), the current-carrying capability of the conductor at any given diameter is increased. The geometry of the messenger can be varied without regard to the structure of the conductor. Inasmuch as the messenger comprises a insulative member, current division between the conductor and the messenger is eliminated. Furthermore, by separating the messenger from the conductor, the heat of the conductor minimally effects the messenger. In turn, less expensive mechanical grades of fibers may be utilized for the messenger, as the heat capacity of the messenger is reduced. Similarly, high Tg resins are typically not required, as the messenger is outside of the current carrying path and is exposed along most of its length to ambient air.

Furthermore, due to the separation, it is typically not necessary to coordinate the coefficient of thermal expansion of the messenger to that of the conductor. Additionally, the conductor will typically be subject to a much different range of temperatures. For example, the conductor may be in the range of 200° C. while the messenger may be at half of that temperature, or less. Additionally, the line sag is generally controlled by the messenger, as one span of the messenger may include or support five sub-spans of the conductor.

Furthermore, as the conductor is generally not under full tension (while the messenger is subjected to full tension), full tension splices and dead ends are preferably required only for the messenger. Due to the increase in current carrying capacity with little to no increase in weight, the conductor of the present invention is well suited as a replacement to conventional conductors, through, for example reconductoring. In particular, additional structures and right of ways are not necessary. Of course, other advantages than those identified herein are contemplated.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A transmission line assembly for transmission and distribution of high voltage power comprising:
 a conductor having a predetermined length, the conductor comprising an un-sheathed stranded aluminum member with a current carrying voltage of at least 2,400V;
 a separate messenger member having a predetermined length, which is less than the predetermined length of the conductor, the messenger comprises an insulative member including a core including a plurality of carbon fibers and a plurality of glass fibers, wherein the carbon fibers are completely surrounded by glass fibers and wherein the plurality of carbon fibers and the plurality of glass fibers are embedded in a resin matrix;
 means for coupling the messenger to the conductor, such that the messenger member remains structurally separate from the conductor and functionally independent thereof;
 wherein the conductor and the messenger member are spaced apart from each other a predetermined distance, and wherein the coupling means facilitates the maintenance of the separation of the messenger relative to the conductor, and
 wherein the coupling means comprises a bracket member having a messenger indentation at a first end thereof and a conductor indentation at the other end thereof, a messenger clamp assembly is pivotably coupled to bracket member proximate the messenger indentation, whereupon the messenger clamp cooperates with the bracket member to retain the messenger within the messenger indentation, and, a conductor clamp assembly is pivotably coupled to the bracket member proximate the conductor indentation, whereupon the conductor clamp cooperates with the bracket member to retain the conductor within the conductor indentation.

2. The transmission line assembly of claim 1 wherein the conductor comprises a substantially circular cross-section.

3. The transmission line assembly of claim 1 wherein the plurality of glass fibers comprises one or more of the following fibers: s-glass fibers, r-glass fibers, s2-glass fibers or other glass fibers.

4. The transmission line assembly of claim 1 wherein the conductor is structurally configured to operate between 2,400 V and 765,000 V.

5. The transmission line assembly of claim 1 wherein at least one of the messenger indentation and the conductor indentation includes a liner or a resilient member to preclude damage to the respective one of the conductor and messenger relative to the bracket member.

* * * * *